United States Patent
Knecht et al.

(10) Patent No.: US 12,174,848 B2
(45) Date of Patent: Dec. 24, 2024

(54) AUTOMATED EXTRACT, TRANSFORM, AND LOAD PROCESS

(71) Applicant: ONTOFORCE NV, Ghent (BE)

(72) Inventors: Kenny Knecht, Mariakerke (BE); Paul Vauterin, Drongen (BE); Hans Constandt, Schepdaal (BE)

(73) Assignee: ONTOFORCR NV, Ghent (BE)

( * ) Notice: Subject to any disclaimer, the term of this patent is extended or adjusted under 35 U.S.C. 154(b) by 627 days.

(21) Appl. No.: 17/266,432

(22) PCT Filed: Aug. 19, 2019

(86) PCT No.: PCT/EP2019/072180
§ 371 (c)(1),
(2) Date: Feb. 5, 2021

(87) PCT Pub. No.: WO2020/035622
PCT Pub. Date: Feb. 20, 2020

(65) Prior Publication Data
US 2021/0294813 A1    Sep. 23, 2021

(30) Foreign Application Priority Data
Aug. 17, 2018   (EP) .................... 18189635

(51) Int. Cl.
*G06F 16/25* (2019.01)
*G06F 16/22* (2019.01)
(52) U.S. Cl.
CPC ........ *G06F 16/254* (2019.01); *G06F 16/2228* (2019.01); *G06F 16/252* (2019.01); *G06F 16/258* (2019.01)

(58) Field of Classification Search
CPC .. G06F 16/254; G06F 16/2228; G06F 16/252; G06F 16/258
See application file for complete search history.

(56) References Cited

U.S. PATENT DOCUMENTS

| | | | |
|---|---|---|---|
| 2015/0026136 A1* | 1/2015 | Rathod | G06F 16/122 707/692 |
| 2017/0142200 A1* | 5/2017 | Kodner | H04W 4/21 |
| 2018/0129708 A1* | 5/2018 | Beavin | G06F 16/24552 |

OTHER PUBLICATIONS

Anonymous, "Extracting data from a Comma-Deliniated List in a Mysql Database", Adobe Community, Sep. 2014, 5 pages, retrieved from the internet: URL:https://forums.adobe.com/thread/1578066 (Year: 2014).*
Von Stetten, Carl, 'Re:extracting data from a comma-deliniated list in a Mysql database', Adobe Community [online], Sep. 18, 2014 09:13, p. 1-3, retrieved on Dec. 11, 2018 from the Internet: URL:https://forums.adobe.com/thread/1578066 (Year: 2014).*
International Search Report and Written Opinion from PCT Application No. PCT/EP2019/072180, Sep. 16, 2019.
Search Report from corresponding EP Application No. EP18189635.8, Dec. 12, 2018.

(Continued)

*Primary Examiner* — Irete F Ehichioya
*Assistant Examiner* — Xiaoqin Hu
(74) *Attorney, Agent, or Firm* — Workman Nydegger

(57) ABSTRACT

A computer-implemented method is provided for an automated extract, transform, and load process for a target database comprising linked data. During the data transformation phase linked data elements are added as data to a data set.

11 Claims, 5 Drawing Sheets

Mesh Table With Publication(s) added as data

| MESH ID | Symbol | Name | PUBLI$ |
|---|---|---|---|
| URI/MESH/1 | D000001 | Calcimycin | URI/PUB/1 , URI/PUB/2 |
| URI/MESH/2 | D000002 | Temefos | URI/PUB/1 |
| URI/MESH/3 | D000003 | Abattoirs | URI/PUB/2 |
| URI/MESH/4 | D000004 | Abbreviations as Topic | |
| URI/MESH/6 | D000006 | Abdomen, Acute | URI/PUB/4 |
| ... | ... | ... | ... |

(56) References Cited

OTHER PUBLICATIONS

Anonymous, "Extracting data from a Comma-Deliniated List in a Mysql Database", Adobe Community, Sep. 24, 2014, 5 pages, retrieved from the internet: URL:https://forums.adobe.com/thread/157806 6.

* cited by examiner

Publications Table 222

| Publ ID | Title | MeshList |
|---------|-------|----------|
| URI/PUB/1 | Title1 | URI/MESH/1, URI/MESH/2 |
| URI/PUB/2 | Title2 | URI/MESH/1, URI/MESH/3 |
| URI/PUB/3 | Title3 | |
| URI/PUB/4 | Title4 | URI/MESH/5, URI/MESH/6 |
| ... | ... | ... |

FIG. 2

Mesh Table 224

| MESH ID | Symbol | Name |
|---------|--------|------|
| URI/MESH/1 | D000001 | Calcimycin |
| URI/MESH/2 | D000002 | Temefos |
| URI/MESH/3 | D000003 | Abattoirs |
| URI/MESH/4 | D000004 | Abbreviations as Topic |
| URI/MESH/6 | D000006 | Abdomen, Acute |
| ... | ... | ... |

FIG. 3

Inverted relations KVS

| KEY | VALUE |
|---|---|
| URI/MESH/1 | URI/PUB/1 , URI/PUB/2 |
| URI/MESH/2 | URI/PUB/1 |
| URI/MESH/3 | URI/PUB/2 |
| URI/MESH/5 | URI/PUB/4 |
| URI/MESH/6 | URI/PUB/4 |
| ... | ... |

FIG. 4

Mesh Table With Publication(s) added as data

| MESH ID | Symbol | Name | PUBLIST |
|---|---|---|---|
| URI/MESH/1 | D000001 | Calcimycin | URI/PUB/1 , URI/PUB/2 |
| URI/MESH/2 | D000002 | Temefos | URI/PUB/1 |
| URI/MESH/3 | D000003 | Abattoirs | URI/PUB/2 |
| URI/MESH/4 | D000004 | Abbreviations as Topic | |
| URI/MESH/6 | D000006 | Abdomen, Acute | URI/PUB/4 |
| ... | ... | ... | ... |

FIG. 5

Mesh Table With Publication(s) added as data

| MESH ID | Symbol | Name | PUBLIST | CNT |
|---|---|---|---|---|
| URI/MESH/1 | D000001 | Calcimycin | URI/PUB/1, URI/PUB/2 | 2 |
| URI/MESH/2 | D000002 | Temefos | URI/PUB/1 | 1 |
| URI/MESH/3 | D000003 | Abattoirs | URI/PUB/2 | 1 |
| URI/MESH/4 | D000004 | Abbreviations as Topic | | 0 |
| URI/MESH/6 | D000006 | Abdomen, Acute | URI/PUB/4 | 1 |
| ... | ... | ... | ... | ... |

| | Time<br>2.8M (s) | Memory<br>2.8M (MB) | Disk Usage<br>2.8M (MB) | Time<br>28M (s) | Memory<br>28M (MB) |
|---|---|---|---|---|---|
| EMBODIMENTS INVENTION | | | | | |
| Python impl | 41,68 | 843 | 982,48 | 443,53 | 8186 |
| C++ impl | 16,00 | 769 | 982,48 | 166,51 | 7761 |
| RELATIONAL DATABASE JOIN | | | | | |
| SQLite in-memory (with index) | 155,98 | 7846 | 1404,65 | - | - |
| SQLite file (with index) | 197,97 | 1728 | 5059,29 | 15491 | 2887 |
| SQLite file (without index) | 334,73 | 2294 | 3309,28 | - | - |

AUTOMATED EXTRACT, TRANSFORM, AND LOAD PROCESS

TECHNICAL FIELD

There is described a computer-implemented method and system related to the technical field of extraction, transformation and loading of data. More particular an automated Extract, Transform and Load process or ETL process for a target database comprising linked data.

BACKGROUND

An Extract, Transform and Load or ETL process is generally known to person skilled in the art of database systems. Especially in the context of large scale operational databases or data warehouses which make use data provided by one or more source systems.

One known example of such a large scale operational database is the Disqover platform marketed by applicant which integrates in its data platform over one hundred different data sources. These data sources range from data sources comprising public data, data sources provided by commercial data providers, in-company data sources, etc. comprising data in-company databases, etc. providing data about for example genes, proteins, clinical data, patient histories, clinical trials, molecules, etc. which are to be made available to the users of the semantic search platform in an efficient and user-friendly way.

During the ETL process such a known system for example makes use of ontologies, formal naming conventions, metadata descriptions, etc. to identify specific entities in the data sources. This allows the ETL process to categorize, standardize, organize, etc. so that the data loaded to the operational database of the semantic search platform is provided in a more structured way such that the operations of the search platform can be performed efficiently. It is clear that in the field of computer science and information science, an ontology encompasses for example a representation, formal naming, and definition of the categories, properties, and relations between the concepts, data, and entities that substantiate one, many, or all domains.

Further the ETL process of such a semantic search platform also processes the source data in such a way that links, which establish relationships between different data points, can be established and provided to the operational database in a structured way. It is clear that in the field of computer science and information science linked data typically refers to structured data that is interlinked to be useable for semantic queries. Typically, such linked data is structured in a way that the relationships between different data points can be processed automatically by computers, and typically makes use of generally known web technologies such as HTTP, RDF and URIs, etc.

In general, such an ETL process comprises a data extraction phase in which source data is extracted from one or more data sources. As described above these data sources could for example comprise homogeneous or heterogenous data sources and could for example originate from different data source systems. The data extraction phase ensures for example that data is extracted from the data source in an available data source format such as for example a relational database, XML, JSON, flat files, etc. and converted into a data format appropriate for a subsequent data transformation phase.

During the data transformation phase the extracted source data is transformed to target data for the target database. It is clear that this data transformation phase requires large computational resources in the context of large scale requiring a lot of large scale data processing operations. This is especially the case when use is made of linked data, for example in the context of a semantic databases or data stores. As will be explained in further detail below, known systems, which make use of for example triple stores and indexes require a large amount of memory and processing power to perform the necessary transformation processes and to provide for an efficient target database for linked data of large data set. This gives rise to increasing delays for loading the data in to the target database and puts limits on the scalability and responsiveness of the target database. The transformation phase of such large-scale datasets for example could take several hours and requires extensive memory and processing requirements.

Finally, an ETL process comprises a data load phase in which the target data produced during the transformation phase is loaded into the target database. Prior art approaches of the ETL process typically produce target data for the target database which further requires further resource intensive operations to be performed by the operational target database, for example after the target data was loaded into the operational target database and/or during use of the operational target database. This results in further bottlenecks with respect to the latency associated with making available the loaded target data in the operational target database for use by an end user, after the ETL process was completed. This also results in further performance bottlenecks during use of the operational target database, as, for example at query time, resource intensive operations need to be performed by the operational target database to process large amounts of the loaded target data. This is especially relevant, when for example frequent large-scale operations, such as pivoting, linking, querying, faceting, inferencing, etc. of large amounts of linked data are to be performed, which are common operations in the context of for example a semantic search system. Still further, there is for example known an internet publication: Anonymous: "extracting data from a comma-deliniated list in a Mysql database Adobe Community", 24 Sep. 2014, pages 1-5, XP055533047, which is not related to an ETL process of a large in the context of large scale operational databases or data warehouses. It is related to a question for an sql statement for a relational database system, Mysql, to match umbers of a comma-delimited list in a single database column, meememberIDs, to the primary key of a personnel table. It is mentioned that storing comma-delimited lists in a single data base column is considered "a bad idea", and that multiple values in the comma-delimited list should be stored as multiple values through a relationship or join table. According to this alternative database schema, for example instead of a comma-delimited list of personnel id's in the meememberIDs column of the Meetings Table, there is provided a MeetingsPersonnel table in which each combination of meeting and personnel there is stored a record. As shown in the publication instead of a single meeting database record comprising a comma delimited list of for example three values, the database schema results in three records for this single meeting. Subsequently an sql query statement for that new database schema is provided for retrieving a list of people who attend a single meeting by means of multiple table join operations. For the example above this will thus result in a list of three names and corresponding email addresses. It is indicated that indexes on these tables are required to increase the performance. The alternative solution of parsing the comma-delimited list into a temporary table, then using the temporary table to be the intermediate join, is marked as highly inefficient, especially as the number of employees who attend a specific meeting increases.

There remains a need for an improved ETL process which is able to overcome above drawbacks and which is able to provide for a more efficient transformation phase. Preferably the ETL process also produces target data, which once loaded in the target database results in a more performant target database, particularly in the context of large scale, linked data.

SUMMARY

In order to answer the above needs, according to a first aspect of the invention, there is provided a computer-implemented method for an automated extract, transform, and load process for a target database comprising linked data, wherein the method comprises the following steps:
  A data extraction phase in which source data is extracted from one or more data sources;
  A data transformation phase in which the source data is transformed to target data for a target database; and
  A data load phase in which the target data is loaded into the target database,
wherein the data transformation phase comprises the following steps:
  Receiving source data comprising a first data set comprising first data entities, said first data entity comprising:
    A first data element; and
    A first set of related second data elements;
  Receiving source data comprising a second data set comprising second data entities, said second data entity comprising:
    The second data element
  Creating a third data set comprising a third data entity for each second data element of the sets of the first data entities of the first data set, the third data entity comprising:
    This second data element; and
    A second set comprising the aggregation of the first data elements related to this second data element in the first data set
  Creating a fourth data set comprising the second data set by:
    Scanning for each second data entity of the second data set if there exists a third data entity in the third data set with a matching second data element;
    When a matching second data element is detected in the third data set, adding the corresponding second set of the detected third data entity to the second data entity, thereby creating a fourth data entity of the fourth data set.

In this way, as will be explained in further detail below, a more efficient transformation phase of the ETL process is obtained, in the context of large scale, linked data. When making use of similar hardware resources, the time needed to perform the transformation phase of the ETL process is significantly reduced beyond what is attainable by means of prior art methods and without the need to make use of pre-created indexes. Additionally, the target data created by the ETL process also allows for a more performant operational database once this target data is loaded into the operational database. During the ETL process, the linked data is inserted into the fourth data set as data elements of the target data which is subsequently loaded into the target database. The target data as created by the improved ETL process, in this way, once loaded into the target operational database, results in a reduced latency for making available the linked data in the operational target database to the end user. Further the target data as produced by the improved ETL process, once loaded into the operational target database also allows for an increased performance when processing query request, browse requests, etc. which require access to large amounts of linked data, as such queries, browse requests etc. will be able to be handled by means of the linked data that was added to the target data during the ETL process, thereby reducing the need to make use of extensive, large scale, resource intensive operations during use of the operational target database.

According to an embodiment there is provided a method, wherein the third data set is not indexed during the data transformation phase. This means that during the data transformation phase there is not stored a database index for the third data set. In other words, there is not created a further database index, also referred to as index, before or during the data transformation phase, for this third data set. Further it is clear that no use is made of a relational database system and/or a database schema and/or one or more join operations for creating the third data set and the fourth data set during the data transformation phase. Further it is clear that during the data transformation phase no relational database files are generated.

In this way the creation, complexity, computing resources, maintenance, delay, etc. related to such extensive indexes for large scale data sets can be avoided. Further, as no use is made of such relational database systems and related database schema or join operations, avoids the creation of corresponding database files and thereby reduces the number of input and output operations, which during the processing of large scale data sets during an ETL process form a bottle neck.

According to a further embodiment, there is provided a method, wherein any of the following data sets are not indexed during the data transformation phase: the first data set; the second data set; the third data set; and the fourth data set. This means that during the data transformation phase there is not stored a database index for these data sets. In other words, there is not created a further database index, also referred to as index, before or during the data transformation phase, for these data sets.

This further improves the performance and efficiency of the ETL process.

According to a further embodiment, there is provided a method, wherein:
  at step (410) the third data set is created sequentially by means of a full table scan of all first data entities of the first data set; and
  at step (430) the fourth data set is created sequentially by means of a full table scan of all second data entities of the second data set; and/or
  at step (410) the second set of each a third data entity of the third data set is aggregated sequentially during a full table scan of all first data entities of the first data set; and
  at step (430) the fourth data set is created sequentially by means of a full table scan of all second data entities of the second data set in which for each second data entity with a match the corresponding second set of the detected third data entity is added once.

In this way a simple, robust and scalable ETL process is provided. It is clear that such an approach in which for the third data entity the aggregation is immediately performed during the full table scan for the creation of for example a fast KVS is very performant as it only requires the sequential updating of the value of a certain key to perform the required aggregation. Subsequently this aggregated data can then be added to the forth data set very efficiently by means of the scan and match approach during a further full table scan, which can be performed very efficiently against for example such a KVS. Such an approach is far more performant than for example a join operation on the tables of a relational database, especially when the first set of related second data elements of the first data entity are also provided in the form of aggregated data. It will be clear from the description below that, in this way the aggregated data of the first set of related second data elements of the first data entity is directly processed to generate, for the third data set, the second set comprising the aggregation of the first data elements related to the second data element in the first data set. This single step transformation to, for example an in-memory schemaless structure such as a Key Value Store, from the aggregated data in the first data set to the aggregated data in the third data set, by means of the above mentioned full table scan results in performance benefits when processing large data sets.

According to a further embodiment, there is provided a method, wherein, the step of creating the fourth data set further comprises:

after the step of creating a fourth data entity of the fourth data set, the step of removing from the third data set the detected third data entity for this created fourth data entity.

In this way the memory resources can be freed up other ETL processes.

According to a further embodiment, there is provided a method, wherein the data transformation phase, after completion of the step of creating the fourth data set, comprises the further steps of:

storing any remaining third data entities in the third data set as link errors; and/or subsequently removing the third data set.

In this way link verification can be performed efficiently during the data transformation phase, and memory can be freed up on the go, thereby leading to a still further improvement in the efficiency of the overall transformation phase of the ETL process.

According to a further embodiment, there is provided a method, wherein the third data set is a temporary data set stored in volatile memory which is removed after creation of the fourth data set.

None of the prior art ETL processes allow for such a fast in-memory process for such large-scale datasets comprising linked data.

According to a further embodiment, there is provided a method, wherein the third data set comprises a Key Value Store in which the third data entities are key-value pairs comprising:

the second data element as key; and the second set as value.

Such a KVS allows for a performant key based match operation during the full table scan for the creation of the fourth data set.

According to a further embodiment, there is provided a method, wherein:

the first data element comprises a unique identifier of the first data entity of the first data set; and/or the second data element comprises a unique identifier of the second data entity of the second data set.

In this way the memory and bandwidth consumed by the third data set can be limited.

According to a further embodiment, there is provided a method, wherein the first data elements and/or the second data elements are stored in a compressed form in the third data entities of the third data set.

This further reduces the storage cost and bandwidth related to the third data set during the transformation phase.

According to a further embodiment, there is provided a method, wherein the transformation phase further transforms the fourth data set to target data for the load phase.

Although alternative embodiments are possible in which further data sets are transformed to target data, according to some embodiments a performance benefit could also be obtained when only the fourth data set is processed by means of the improved ETL process.

According to a further embodiment, there is provided a method, wherein the method comprises the further step of loading the target data into the target database, thereby making the added second set available as a data element of the fourth data entity of the fourth data set.

In this way, a more performant operational target database is realized as queries relating linked data can be handled based on the data present in the transformed target data the need for further extensive queries in the target data set.

According to a second aspect of the invention, there is provided an automated extract, transform and load system, comprising a processor configured to perform the computer-implemented method according to the first aspect of the invention.

According to a third aspect of the invention, there is provided a computer program comprising instructions which, when the program is executed by a computer, cause the computer to carry out the method according to the first aspect of the invention.

According to a fourth aspect of the invention, there is provided a computer-readable storage medium, data carrier and/or data signal carrying the computer program of the third aspect of the invention.

BRIEF DESCRIPTION OF THE DRAWINGS

The description of exemplary embodiments will be supported by accompanying drawings, in which:

FIGS. 2-7 schematically shows an embodiment of different steps of the method shown in FIG. 1;

DESCRIPTION

Figure 1:
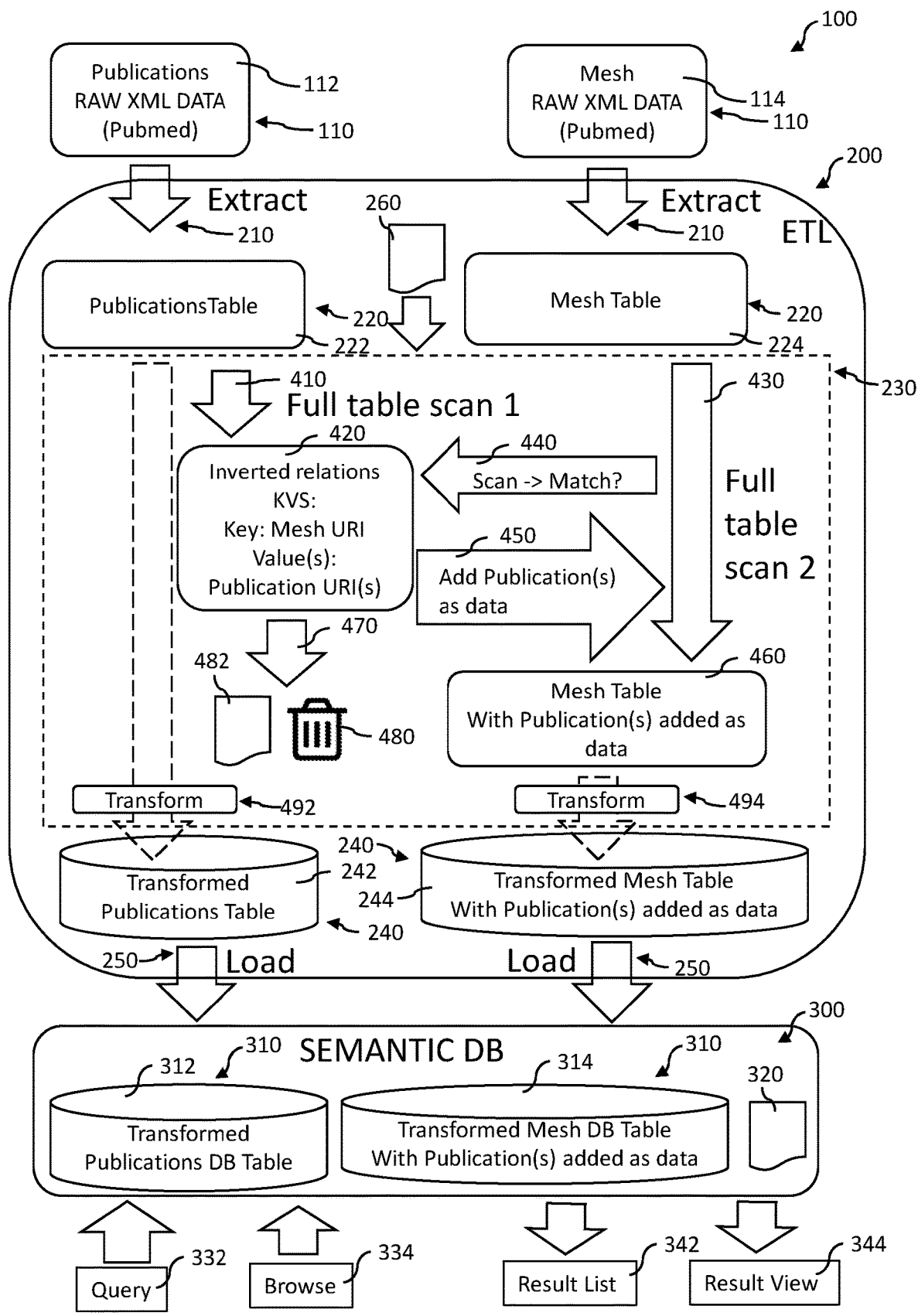
FIG. 1 shows an embodiment of a computer-implemented method according to the invention.

FIG. 1 schematically shows an embodiment of a computer-implemented method 100 for an automated extract, transform, and load process 200. As will be explained in further detail below the Extract, Transform and Load process or ETL process 200 produces a target database 300 comprising linked data 310. As shown the embodiment of the method 100 comprises the following main steps: a data extraction phase 210, a data transformation phase 230 and a data load phase 250. According to the embodiment shown, in the data extraction phase 210 source data 220 is extracted from one or more data sources 110. In the data transformation phase 230 the source data 220 is then transformed to target data 240 for a target database 300. Finally, in the data load phase 250 the target data 240 is loaded into the target database 300. As will be explained in further detail below, it is clear that the target database 300, for example comprises a semantic database which comprises linked data 310 of which the links or relations are for example described in a semantic data model, or any other suitable linked data model 320 associated with the operational target database 300 which specifies related data elements.

The embodiment shown in FIG. 1 will be illustrated by a particular example of data. It is clear that this exemplary data is provided merely for the purpose of enabling a clear description of the different steps of the process, and that alternative embodiments of data are possible, which can be processed in a similar way. As shown in FIG. 1, according to this embodiment the automated ETL process 200 receives as input two raw data sets 112, 114 from a data source 110. According to this embodiment the data source 110 is for example similar to the well known publicly available MEDLINE/PubMed data, which is for example downloadable at https://www.nlm.nih.gov/databases/download/pubmed_medline.html. Such raw data is for example provided as raw data in files according to a particular XML format. There is for example provided a first raw data set 112 which comprises in a structured XML format data about publications referred to as articles, such as for example journal information, publication details, authors, chemicals, Medical Subject Headings also known as MeSH, etc. The description will focus on an example in which the linked data concerns the relation between such a publication record and the associated MeSH. Such a MeSH relates to the National Library of Medicine or NLM controlled vocabulary thesaurus used for indexing articles for PubMed data. As shown in FIG. 1 such a first raw data set 112 is received as input of the extraction phase 210 of the ETL process 200. During this extraction phase 210 the XML file associated with the first raw data set 112 is for example downloaded and converted to source data 220 comprising a suitable format for the subsequent transformation process 230. According to the embodiment of FIG. 1 the XML format of the first raw data set 112 is for example converted to a suitable table format thereby forming a first data set 222 of source data 220 as for example shown in the embodiment of FIG. 2 arranged in a suitable way in rows and columns as will be described in further detail below. It is clear that this tabular representation of FIG. 2 is merely one of a several possible embodiments of suitable data sets.

As further shown, according to the embodiment of FIG. 1, also a second raw data set 114 is extracted during the extraction phase 210. Similarly, as for example described for the first raw data set 112, this could for example be an XML file associated with structured XML data about the FIG. 2 shows schematically an embodiment of a first data set 222 of the controlled thesaurus of the Medical Subject Headings or MeSH itself, as maintained by the NLM. An example of such XML raw data comprising MeSH descriptors, qualifiers, etc. can for example be download at ftp://nlmpubs.nlm.nih.gov/online/mesh/MESH_FILES/xmlmesh/. Such a second raw data set 114, will thus comprise structured XML format data about MeSHs, such as for example a MeSH identifier, name, creation date, revision date, history, concepts, notes, etc. According to the embodiment of FIG. 1 the XML format of the second raw data set 114 is for example converted to a suitable table format thereby forming a second data set 224 of the source data 220 as for example shown in the embodiment of FIG. 3. Similarly, as for the embodiment of FIG. 2, the table format which arranges the data set in a suitable way in rows and columns as will be described in further detail below is merely one of a several possible embodiments of suitable data sets.

According to the embodiment shown in FIG. 1 the data transformation phase 230 receives the first data set 222 of the source data 220 as input. As shown in FIG. 2 first data set 222 comprises first data entities 520, which according do the embodiment shown, correspond to a single row 520 of the table 222 which corresponds to the first data set 222. The extraction phase 210, according to the embodiment shown, has for example data relating to a plurality of publications from the first raw data set 112 and arranged this data in a plurality of rows of the table, one row for each of the publications. As schematically shown for each of row of a publication the data is arranged in three corresponding columns labelled "Publ ID", "Title", "Mesh List". The "Publ ID" column for example comprises a unique identifier for the publication, such as for example a suitable URI or Uniform Resource Identifier or any other suitable unique identifier. The "Title" column for example comprises the text of the title of the publication. The "MeshList" column for example comprises for each of the publication the set of MESH associated therewith.

In this way the Publications table 222 embodies a first data set 222 of the source data 220. As shown the Publications table 222 comprises a plurality of publication rows 520 embodying a plurality of first data entities 520. As further shown each publication row 520 comprises for each column of the table a cell which comprises a data element or a set of data elements. In this way the first row 520 comprises in the cell of its "Publ ID" column a data element comprising data of the identifier of the publication, schematically shown as "URI/PUB/1", which is for example a suitable URI for identifying the publication. The cell of the "Title" column comprises a data element related to the title of this publication, schematically shown as "Title1". The cell of the "MeshList" column of the first row 520 comprises a set of two data elements, related to the two MeSHs that are associated with this publication. As schematically shown this cell comprises a list of two identifiers of MeSH schematically shown as "URI/MESH/1" and "URI/MESH/2" which are associated with the publication of this row. These could for example be suitable URIs for identifying these two Mesh.

The embodiment of FIG. 2 schematically shows a publications table 222 with at least four rows with data for four publications which will be referenced by means of their identifier in the "Publ ID" column in the following description. As shown each row comprises a data element for the "Publ ID", the "Title" and a set of data elements for the "MeshList". It is clear that, as shown, for example the "MeshList" column could comprise a plurality of identifiers of MeSHs, a single identifier of a MeSH or no identifier of a MeSH at all. It is thus clear that, according to the embodiment shown, the "MeshList" column forms for each publication row a set of data elements which could comprises a non-empty set comprising one or more data elements, however it is also possible that it comprises an empty set which means it does not comprise an entry for the data element. For the following description of this embodiment, it should be clear that in this way each row of the publications table 222 thus corresponds to a first data entity 520. The URI of the publication in the "Publ ID" column of this row represents a first data element 522 of this first data entity 520. The list of URIs of the MeSHs associated with the URI of this publication of this row represent a set 524 of related second data elements 526. It is thus clear that in this way a row of the publications table 222 represents a first data entity 520 comprising a first data element 522; and a first set 524 of related second data elements 526.

Similarly, as explained above with reference to the publications table 222, also the Mesh Table 224, which represents a second data set 224 of the received source data 220 comprises a similar row and column structure. As shown each row which of the Mesh Table 224 corresponds to a second data entity 540 comprising data related to a MeSH as extracted from the second raw data set 114. As shown the embodiment of the Mesh Table 224 comprises three columns "MESH ID", "Symbol" and "Name". The column "MESH ID" comprises for example comprises as a data element a unique identifier for the MeSH, which is for example a suitable URI, such as for example shown as "URI/MESH/1" for the first row. The columns "Symbol" and "Name" respectively for example comprise a symbolic code of the MeSH and a descriptive name of the MeSH. For the following description of this embodiment, it should be clear that in this way each row of the Mesh table 224 thus corresponds to a second data entity 540, the Mesh table 224 itself thus corresponding to a second data set 224 of the source data 220, which comprises these second data entities 540. It is further clear that the data element of the "MESH ID" column of the row 540 of the Mesh Table 224 is the data element 526 as present in the set 524 of data elements 526 of the "MeshList" column of the Publications table 222, namely a mesh URI 526. It is thus clear that the Mesh Table 224 thus embodies in this way a second data set 224 of the source data 220 comprising second data entities 540 embodied as the rows 540 for each MeSH. The rows 540 of the Mesh Table 224 thus embody the second data entities 540 which comprise the second data element 526, namely the URI of the MeSH 526. It is thus clear that the tables of FIGS. 2 and 3 provide a schematic embodiment in which the second data element 526 of the second data set 224, corresponds to the second data element 526 of the first set 524 of the first data set 222.

As further shown, the link between the second data element 526 in both the first data set 222 and the second data set 224 could be provided to the automated ETL process 200 in for example the form of a configuration file, which comprises a suitable indication that the "MeshList" column of the publications table 222 and the "MESH ID" column of the Mesh table 224 comprise linked data which could be handled by the transformation phase 230 as described in further detail below. However, it is clear that alternative embodiments are possible in which the presence of such linked data in two data sets of the source data is detected automatically or derived from other information such as for example a linked data model 320 or a semantic data model 320 of the target database 300, or in any other suitable way.

As Shown in FIG. 1, the data transformation phase 230 processes the publications table 222 at step 410 by creating a third data set 420 schematically illustrated as the "inverted relations KVS" of FIG. 4. According to the embodiment shown in FIG. 4 the result of this step 410 in the transformation phase 230 is preferably embodied as an in-memory Key Value Store 420 as this provides for a very performant and efficient storage structure, however it is clear that alternative embodiments for the third data set 420 are possible. According to the embodiment shown in FIG. 4 the Key-Value Store 420 or key-value database or KVS comprises a collection of objects or records which are stored and retrieved using a key that uniquely identifies the object or record in this way allowing for a performant and efficient way to find the data stored as values. As shown, the inverted relations KVS 420 comprises key-value pairs 550 which embody a third data entity 550 of the third data set 420. According to a particular simple embodiment in step 410 the KVS 420 is created by sequentially processing the rows 520 of the publications table 222, for example by means of a process known as a full table scan. It is thus clear that such a full table scan or sequential scan refers to a process in which each row of a table is read in a sequential or serial order until all rows are read and processed. More generally, this means that each of the first data entities 522 of the first data set 222 are processed in such a sequential or serial manner. It should however be clear that this full table scan preferably refers to a file based operation, in which the file comprising data entities of the data is processed sequentially. In this way there is no need to import the dataset into a relational data base system and make use of a related database schema join operations for creating the third data set and as will be explained in further detail below the fourth data set during the data transformation phase. As will be clear from the description below, in this way it is avoided that during these steps of the creation of the third and fourth data set during the data transformation phase relational database files need to be generated, and related join operations need to be used. In this way the disk usage and number of input and output operations can be minimized, thereby leading to an increased efficiency.

According to the embodiment shown, for example, first the first row of the publications table 222 is processed, then the second row, then the third row, etc. in the following way. For each Mesh URI 526 of the MeshList column 524 of the first row 520 of the publications table it is checked whether the inverted relation KVS 420 already comprises a key for this Mesh URI. If it does not a new key-value pair 550 is added comprising the Mesh URI 526 as key and the Publication URI 522 as value. When processing the first row 520 of the publications table 222 as shown in FIG. 2, this thus means that for the mesh URI "URI/MESH/1" there is created a key value pair in the inverted relation KVS 420 with as key "URI/MESH/1" and as value the related publication URI 522 of the "Publ ID" column of this first row 520 of the publications table 522. Also for the other mesh URI of the first row 520 of the publications table 222 in FIG. 1, namely "URI/MESH/2", there will be created a key value pair in the inverted relation KVS with as key "URI/MESH/2" and as value the related publication URI 522 of the "Publ ID" column of this first row 520, namely "URI/PUB/1".

When processing each of the mesh URIs 526 of the MeshList column 524 of the second row 520 of the publications table 222 of FIG. 2, then the first Mesh URI "URI/MESH/1" will already be present as a key 526 in the inverted relation KVS. As shown, then the related publication URI 522 of this second row 520 of the publications table 222, namely "URI/PUB/2", will be aggregated to the value 554 of this key-value pair 550 in the inverted relation KVS 420 as shown in FIG. 4. For the embodiment shown, this means that the publication URI 522 "URI/PUB/2" is aggregated with the already present publication URIs in the value field of this key, which in this case means "URI/PUB/1". In this way there is thus aggregated with the key for the mesh URI "URI/MESH/1 a value comprising the aggregation of the related publication URIs "URI/PUB/1" and "URI/PUB/2" in the publications table 222. For the other mesh URI "URI/MESH/3" of the second row of the publications table 222, similar as described above, there could be created a new key-value pair in the inverted relations KVS with the mesh URI "URI/MESH/3" as key and the related publication URI "URI/PUB/2" as value, as shown in FIG. 4.

As shown in the embodiment of FIG. 2, the third row of the publications table 222 comprises no mesh URIs in the MeshList column. As shown in FIG. 4, there is no further processing of such a row with respect to the inverted relation KVS as no key-value pair needs to be created as there are no new mesh URIs for corresponding key entries in the KVS.

When the fourth row of the publications table 222 shown in FIG. 2 is processed, similar as explained above, as shown in FIG. 4, there will be added a key-value pair with the mesh URI "URI/MESH/5" as key and the related publication URI of the fourth row of the publications table 222, namely "URI/PUB/4", as value. Also similar as explained above, as shown in FIG. 4, there will be added also a further key-value pair with the mesh URI "URI/MESH/6" as key and also the related publication URI of the fourth row of the publications table 222 as value: "URI/PUB/4".

It is thus clear that, when each row of the publications table 222 in FIG. 2 is processed, there will be created in the inverted relation KVS 420, for each mesh URI 526 of the set 524 of the MeshList column of the rows 520 of the publication table a key-value pair comprising this mesh URI 526 as key and a set 554 comprising the aggregation of the publication URIs 522 related to this mesh URI 526 in the publications table 222. It is clear that, although such an in-memory, index-free, KVS provides for a preferred embodiment, alternative embodiments are possible, such as for example making use of other suitable structures for the third data set 420, such as for example a table, linked list, etc. The above-mentioned example thus embodies an efficient and performant creation at step 410 of a third data set 420 comprising a third data entity 550 for each second data element 526 of the sets 524 of the first data entities 520 of the first data set 222. The third data entity 550 comprising this second data element 526 and a second set 554 comprising the aggregation of the first data elements 522 related to this second data element 526 in the first data set 222.

It is thus clear that in this way in step 410 there is created a third data set 420 in which the relation present in the publications table 222 in which there is a set 524 of MeSHs 526 related to each publication 522, is transformed to what could be referred to as an inverted relation in the inverted relations KVS 420 in which there is a set 554 of publications 524 related to each Mesh key 526. It is clear that in this step 310 preferably this transformation process is handled in what can be referred to as a full table scan or a sequential table scan in which all the rows of the database are processed in a sequential order.

As further shown in the embodiment of FIG. 1, at step 430 the second data set 224 of the source data 220 is also processed during the transformation phase 230 of the ETL process 200. As will be described in further detail below this step 430 will make use of the third data set 420, which was created from the first data set 222 of the source data 220 as described above, to transform the second data set 224 of the source data 220 to a fourth data set 460. According to the exemplary embodiment described above, this means that step 430 of the transformation phase 230 will make use of the inverted relations KVS 420 of FIG. 4 to transform the mesh table 224 of FIG. 3 to the MeSH table with publications added as data as shown in FIG. 5. As schematically shown in FIG. 5, according to the embodiment shown it is clear that the fourth data set 460 comprises the second data set 224. In other words, the table embodying the fourth data set 460 comprises all rows and columns of the mesh table 224 as shown in FIG. 3. As will be explained in more detail below, there is added an additional column "PUBLIST" to the table of FIG. 5. Preferably, also this process is performed in a sequential manner processing each row of the second data set 224 sequentially by means of a process which can be referred to as a full table scan. When processing the first row 540 of the mesh table 224 at step 430, at step 440 the inverted relations KVS 420 will be scanned for a key-value pair 550 of which the key matches to the mesh URI "URI/MESH/1" of the first row 540 of the mesh table 224. In other words, during this scanning step 440, which will be performed for each row 540 of the mesh table 224, there will be checked whether for each second data entity 540 of the second data set 224 if there exists a third data entity 550 in the third data set 420 with a matching second data element 526. This second data element in the embodiment described above thus being embodied as the mesh URI 526 or any other suitable identifier for the MESH. As shown, when scanning the inverted relations KVS for a match of "URI/MESH/1", this will be found in the key-value pair 526 of the first row as shown in FIG. 4. When such a match in the inverted relations KVS 420 is detected, the corresponding value entry of this key-value pair will be added to the additional PUBLIST column of the first row 540 of the mesh table 224, thereby forming the first row 560 of the mesh table with publications added as data 460. In other words, this means that in step 450, when a matching second data element 526 is detected in the third data set 420, the corresponding second set 554 of the detected third data entity 550 is added to the second data entity 540, thereby creating a fourth data entity 560 of the fourth data set 460.

After processing this first row 540 of the mesh table 224, sequentially, the second, third, fourth, etc. row of the Mesh Table 224 can be processed during step 430 similarly as described above. It is clear that for the embodiment described above also at step 440 there will be detected a matching key-value pair in the inverted relation KVS 420 for the mesh URI 526 "URI/MESH/2" of the second row 540 of the mesh table 224. Similarly, as described above, the value of this matching key-value pair 550 will be added at step 450 to the additional PUBLIST column for this second row 540 of the mesh table with publications added as data 460 as shown in FIG. 5. Similarly, also for the mesh URI 526 of the third row 540 of the mesh table 224 at step 440, there will be found a matching key-value pair 550 in the inverted relations KVS 420 of which the value entry 554 will be added to the PUBLIST column of the corresponding third row of the mesh table with publications added as data 460 as shown in FIG. 5.

As further shown in FIG. 3, the fourth row of the mesh table 224 comprises a mesh URI "URI/MESH/4". When in step 440 performing the scan for a match in the inverted relations KVS, there will not be detected a matching key for this mesh URI. As shown in FIG. 5, in this case there are no publications added to the PUBLIST column of the mesh table with publications added as data table 460. In other words, nothing is added to the second data entity 540 corresponding to this row or alternatively an empty data element is added to create the fourth data entity 460 in step 450.

As further shown the Mesh Table 224 continues with a fifth row comprising a mesh URI "UIR/MESH/6". Similar as explained above when during step 430 as next row in the sequence, this row of the Mesh Table 224 is processed, then during step 440, there will be found a match in the fifth row of the inverted relations KVS 420. The corresponding value 554 of this key-value pair 550 will be added as data to the "PUBLIST" column of the fifth row of the Mesh table with publications added as data 460 as shown in FIG. 5 during step 450.

As further made clear by means of the above mentioned embodiment, is that in this way, the mesh URI "URI/MESH/5", which was present in the MeshList column of the fourth row of the publications Table 222, and, as described above, in this way, by means of step 410, ended up as the key of the fourth key-value pair of the inverted relations KVS 420, will not end up in the Mesh table with publications added as data 460. This is because the mesh URI "URI/MESH/5" is for example not present as a "MESH ID" in the mesh table 224. This is for example because this mesh URI relates to an outdated entry, still present in the publications db 222, erroneous data inputted in the publications table 222, etc. As will be explained in further detail below, in this way a verification of the linked data can be performed as there will not be added to the Mesh table with publications added as data any data relating to mesh URIs not present in the mesh table 224. Further any mesh URIs present in the publications table, that are not present in the mesh table 224, will end up in the inverted relations KVS 420. During step 430, these mesh URIs will never be matched to a key of the mesh table 224 in step 440 and their value will thus never be added as data in step 450. As will be described in further detail below, this allows for an efficient verification and error reporting.

Preferably the inverted relations KVS 420, which embodies the third data set 420 is not indexed during the data transformation phase 230. This means that the third data set 420, preferably, during the ETL process 200 is and remains a data set 420 which is not indexed. The lack of the need for the creation and storage of such an index for the third data set 420, before and/or during the transformation phase 230, increases the performance of the ETL process 200, as the third data set 420 is immediately available once created, without any further delay or additional storage or processing power associated with the creation and storage of a further data structure for a database index. Preferably the third data set 420 is stored in a data structure, such as a key value store, in which a matching data element can be performed very efficiently, even without the creation and storage of a further data structure for a database index. It is clear that the retrieval of a single key from data structures, such as for example a key value store, an ordered list, etc. can typically be performed very efficiently.

It is clear that, because the operations described above as full table scans, in step 410 and step 430, are performed in a sequential manner, it is also not required to create an index for the first data set 222, the second data set 224, nor the fourth data set 460. It is this clear that also here the associated delay and additional memory and processing resources with the creation of such an index can be avoided, thereby leading to a further increase in the efficiency of the transformation phase 230 of the ETL process 200. It is thus clear that these data sets 222, 224, 420, 460 are preferably not indexed during the transformation phase 230 as described above. This means that during the data transformation phase there is not stored a database index for these data sets. In other words, there is not created a further data structure for a database index, also referred to as index, before or during the data transformation phase, for these data sets. This means that preferably they remain not indexed during the transformation phase 230, or at least up to the creation of the fourth data set 460.

As further shown, in the embodiment of FIG. 1, the inverted relations KVS 420, which embodies the third data set 420, is preferably a temporary data set stored in volatile memory of the computing system performing the transformation phase 230 of the ETL process 200, as this allows for fast and efficient operations during creation of the inverted relations KVS 420 at step 410 and during use of the inverted relations KVS at step 430 for the creation of the mesh table with publications added as data 460, which embodies the fourth data set 460. Preferably, as shown, according to the embodiment of FIG. 1, when the inverted relations KVS 420, which embodies the third data set 420, has performed its function during step 430 for the creation of the mesh table with publications as added as data 460, which embodies the fourth data set 460, at step 470 it can be removed or marked for removal in step 480. This means that the memory claimed by the third data set 420 is freed up again for further similar transformation phases 230 of the ETL process 200, and more specifically for the storage of other similar third data sets 420 for similar inverted relations KVS 420 of other linked data. This is especially relevant as preferably in order to increase the performance and efficiency of the transformation phase 230 the third data set 420 is stored in fast, volatile, random access memory also known as RANI memory for allowing the most performant and efficient processing by the processor of the computing system performing the computer-implemented method 100.

It is clear from the above description that preferably, at step 410 the inverted relation KVS 420, which embodies the third data set 420 is created sequentially by means of a full table scan of all first data entities 520 of the first data set 222, which is embodied by the rows 520 of the publications table 222. It should be clear that such a sequential processing only refers to the fact that the all data entities are processed individually until the entire first data set 222 is processed. This also covers embodiments in which this step is performed by processing individual data entities or subsets of data entities in parallel or concurrently, for example on multiple processors, multiple computing system, distributed computing systems, cloud computing systems, etc. It only refers to the fact that each individual data entity of the first data set 222 can be processed individually during the creation of the third data entity 560 by means of the full table scan 410 as described above. It will be clear to a man skilled in the art that such an approach, which is referred to as the full table scan 410, which allows a sequential creation of the third data entities 550 when processing each of the first data entities 520 individually allows for a scalable approach which allows the processing of individual data entities to be distributed among a suitable number of different processors, computing systems, etc. and thus to be processed concurrently in a simple, scalable manner. Similarly, it will be clear to a man skilled in the art that also, at step 430 as described above, the fourth data set 460 is created sequentially by means of a full table scan of all second data entities 540 of the second data set 224, thereby also leading to an efficient scalable approach for distributing the processing related to the creation of individual fourth data entities 560 over any suitable amount of processors, computing systems, etc.

Preferably, as already mentioned above, the third data set 420 is a temporary data set stored in volatile memory which is removed after creation of the fourth data set 460. However, in order to still further optimize the memory usage during the transformation phase with respect to the temporary third data set 420, which preferably is stored in fast RAM memory for fast processing, the above mentioned sequential creation of the fourth data set 460 by means of the full table scan during step 430 allows for a further optimization during the transformation phase 230. According to a preferred embodiment, such a sequential creation of the fourth data set 460, which according to the embodiment described above is embodied as the mesh table with publications added as data 460, allows for the creation of each fourth data entity 560 individually during step 430. This means, as described above, for example first, the first row of the mesh table 224 is processed during step 430 thereby creating the first row of the mesh table with publications added as data table 460. After this first row of the publications added as data table 460, which embodies a first individual fourth data entity 560 of the fourth data set 460, has been created, the corresponding matched key value pair in the inverted relations KVS 420, which embodies the detected third data entity 550 for this created fourth data entity 560, can be removed from the inverted relations KVS 420. For the embodiment described above, the first key value-pair 550 related to key "URI/MESH/1" can be removed from the inverted relations KVS 420. Similarly, after processing the second row 540 of the mesh table 224 during step 430, in other words the next data entity 540 in the sequence of the second data set 224, and the creation of the corresponding second row 560 of the mesh table with publications added as data 460, also here the corresponding row in the inverted relations KVS relating to key "URI/MESH/2" can be removed from the inverted relations KVS 420. It is clear that, during the full table scan of step 430, in this way, sequentially, all key-value pairs 550 of the inverted relations KVS 420 can be removed, after creation of the matching row in the mesh table with publications added as data 460. It is clear that, in this way, the memory used by the inverted relations KVS 420 can already be reclaimed, for example for other concurrent processes of the ETL process 200. It is clear that the above mentioned embodiment provides an example of such an advantageous embodiment in which the step 430 of creating the fourth data set 460, preferably in a sequential way as described above, further comprises, after the step 450 of creating a fourth data entity 560 of the fourth data set 460, the step 470 of removing from the third data set 420 the detected third data entity 550 for this created fourth data entity 560.

It is further also clear that, in the embodiment as described above with reference to FIGS. 1 to 5, when all detected key-value pairs 550, matching to rows 540 of the mesh table 224 during the sequential processing of the full table scan during step 430, will have been removed from the inverted relations KVS 420 after creation of the corresponding row 560 in the mesh table with publications added as data 460, the only key-value pairs 550 remaining in the inverted relations KVS 420 will be key-value pairs 550 comprising keys which have no matching entry in the "Mesh ID" column of the mesh table 224. In other words, any such remaining key-value pairs 550 in the inverted relations KVS 420, relates to Mesh URIs that were present in the publications table 222 for which no corresponding Mesh URI is available as linked data in the mesh table 224. In this way, the transformation phase 230 as described above, by means of the full table scan in step 410 for the creation of the inverted relations KVS and the full table scan in step 430 for the creation of the mesh table with publications added as data 460 ensures that no invalid, outdated, etc. mesh URIs are introduced into the mesh table with publications added as data 460 as a result of the transformation phase 230. Any data present in the publication table 222, relating to mesh URIs for which there is no linked mesh URI available in the mesh table 224, will in this way be retained in the inverted relations KVS 420 after completion of the step 430 of creating the fourth data set 460. According to the embodiment shown in FIG. 1, these remaining key-value pairs 550 can then for example be stored as link errors 482, which can then for example be added to an error log or any other suitable evaluation data structure, for further review. Preferably, as shown, subsequently the inverted relations KVS 420 is then subsequently removed, thereby freeing up any memory it used for use by for example any other processes of the ETL process 200. It is clear that alternative embodiments are possible and that the above-mentioned embodiment, provides an example of a preferred embodiment in which during the data transformation phase 230, after completion of the step 430 for the creation of the fourth data set 460, this means after processing all second data entities 540 of the second data set 224 the following steps are performed: storing any remaining third data entities 550 in the third data set 420 as link errors 482; and/or subsequently removing the third data set 420.

It is clear that still further alternative embodiments are possible, in which preferably, as shown in the embodiment of FIG. 1 the third data set 420 is a temporary data set stored in volatile memory which is removed after creation of the fourth data set 460. As described above, this allows the third data set 420 to reside in fast RANI and additionally allows for an efficient use of the available memory resources.

It is further also clear from the embodiment described above that preferably the third data set 420 comprises or consists of a Key Value Store in which the third data entities 550 are key-value pairs 550 comprising the second data element 526 as key; and the second set 554 as value. Although other data structures are also possible, such a key value store is preferred as it typically reduces the memory needed to store the data set and it is very performant for operations such as a lookup of the value of a matching key.

According to the embodiment shown in FIGS. 1 to 5, it is clear that the first data element 522 comprises a unique identifier of the first data entity 520 of the first data set 222. Such a unique identifier is preferable a uniform resource identifier or URI as such identifiers, as known the person skilled in the art are typically used to identify linked data. Such linked data in the context of a semantic database and/or the semantic web project refers to a method of publishing structured data so that it can be interlinked and become more useful through semantic queries. Such linked data preferably makes use URIs as identifier for its data entities. Further linked data preferably makes use of HTTP URIs for looking up its data entities and makes use of standards such as for example RDF, SPARQL, etc. for providing a suitable description or model of the linked data. Preferably the data entities of linked data make use of URIs for reference to other data entities of linked data, and specifically http URIs for reference to other data entities of linked data which is for example published on the internet. According to the embodiment described above, the first data element 522 for example comprises the publication URI. Preferably, as described above also the second data element 526 comprises a unique identifier of the second data entity 540 of the second data set 224, such as for example a URI. According to the embodiment described above the second data element 526 for example comprises the mesh URI. In this way the data entities of the linked data stored in the third data set 420 consist only of such unique identifiers, which reduces the amount of memory needed for storage of the third data set 420 and increases the performance during creation and consultation of the third data set 420 as the amount of data to be written and/or read during such operations is limited. However, these unique identifiers, and especially the preferred URIs of the second set 554 comprising the aggregation of the first data elements 524 that was added as data to the second data entity 540 for the thereby creation 450 of the fourth data entity 560 of the fourth data set 460, also allow for a suitable way to look up the linked data during subsequent semantic queries after the data set is loaded into the target database.

Preferably, in order to still further reduce the storage requirements and to further increase the performance of the third data set, the first data elements 522 and/or the second data elements 526 are stored in a compressed form in the third data entities 550 of the third data set 420. According to a preferred embodiment the URIs of the first data elements 522 and/or the second data elements 526 are not stored in a full text, string or other similar format, but are for example stored in compressed form, such as for example in the form of a suitable hash value of the URI, which is calculated by means of a suitable hash function which reduces the storage size of the URI to a predetermined number of bytes. However, it is clear that alternative embodiments of compression are possible, which efficiently reduce the storage cost of the first data elements 522 and the second data elements 526 in the third data set 420.

It is clear that, in addition to the transformation process described above, as shown in the embodiment of FIG. 1, optionally the transformation phase 230 at step 494 could transforms the fourth data set 560 set to target data 240 for the load phase 250. Such further transformation operation could for example transform the fourth data set 560 to a suitable format for the target database 300. It is clear that, optionally, still further transformation operations could be performed on the fourth data set 560, such as for example suitable operations such as for example selection, filtering, translation, encoding, deriving calculated values, sorting or ordering, joining, aggregation, generation, transposing, pivoting, data validation, splitting, look up, etc. with respect to the fourth data set. According to the embodiment shown in FIG. 6 such further transformation in step 494 could for example result in a transformed mesh db table with publications added as data by adding a further column "CNT" which comprises a further added data element comprising the number of data elements 524 in the data set 554 of the "PUBLIST" Column, which is for example calculated by counting this number during the transformation step 490 and added as data to the mesh table pith publications added as data 460. It is clear that, similarly, also further transformation operations may be performed on the first data set 224, as shown at step 492 in FIG. 1. According to the embodiment shown in FIG. 1, the publications table 222 is for example transformed to a transformed publications table 242 with for example a suitable format for the target database 300.

As further shown in FIG. 1, the ETL process is completed by the step of loading the target data 240 into the target database 300. According to the embodiment shown the target data 400 comprises both the transformed publications table and the transformed mesh table 244, however, it is clear that numerous alternative embodiments are possible. Preferably, such a step 250, loads target data 240, which at least comprises the fourth data set 460 or a transformed version thereof into the target database 300 thereby making the added second set 554 available as a data element of the fourth data entity 560 of the fourth data set 460 in the target database 300.

As shown in FIG. 1, according to this embodiment, the operational target database 300 comprises the linked data 310 in the form of the loaded database table referred to as the "transformed publications DB table 312" and the loaded database table referred to as the "transformed mesh db table with publications added as data" 314, which result from the above mentioned loaded target data 240 of the ETL process. It is clear that once the target data 240 is loaded into the operational database 300, there typically is no further interaction of the target database 300 with the data sets of the ETL process, and typically the operational database 300 is hosted on a different computing system than that which hosts the ETL process 200. In other words, the operational database 300 processes inputs such as user requests, such as for example a query request, a browse request, etc. and the generation of corresponding outputs, such as for example the generation of corresponding result lists 342, result views 344, etc. without further interaction with the data sets of the ETL process 200.

In order to illustrate the performance enhancements of an embodiment of an ETL process 200 similar to the abovementioned embodiments for a real word example of a large-scale data set comprising linked data. The linked data 300 of the embodiment concerns a similar first raw data set 112 as described above comprising for example 28 million data entities relating to pubmed publications which also comprise linked data with respect to the authors of these publications. A second raw data set 114 is also provided comprising a data set with for example 28 million data entities relating to such authors. These data sets are processed by embodiments of a similar ETL process 200 as described above and in this way generate a fourth data set in which the linked publications have been added to the authors table as a data element of the author data entity, similarly as described above for the linked publications added to the mesh data entity. When use is made of an embodiment in which the transformations process was implemented by means of a suitable scripting language such as python, the ETL process 200 was performed in 11.6 minutes on a suitable test computing system. For the test the raw source data 110 was provided as a text file and the output of the ETL process was the author data set with the publications added as data, also in a text file. It is clear that during the tested embodiment no indexes, nor pre-created indexes were used on any of the data sets during the ETL process 200. The above-mentioned python embodiment required 7.94 GB of memory during execution of the ETL process 200 by the processor of the test computing system. According to a further alternative embodiment in which a similar embodiment of the ETL process 200 was implemented by means of a compiled programming language such as C++, the time needed for the execution of the ETL process on a similar test computing system was even further reduced to 4.0 minutes, and the memory required was reduced to 7.59 GB. As a comparison with prior art system, the linked data was provided in the form of triples comprising the linked data between the publications and the authors, and the inverse relation between this linked data was generated by means of a prior art triple based ETL process for the generation of triples providing the inverse relation between the authors and the publications. In order to increase the performance of this triple based prior art method, use was made of pre-created indices to speed up the query processes during the ETL process. When executing the triple based prior art ETL process on a similar computing system, this resulted in a time of 115.6 minutes needed to complete the ETL process and required over 100 GB of memory. An implementation in which the above ETL process was implemented by means of a map-reduce process implemented in Hadoop and HBase, when executed on a similar test computing system is only able to reduce the time needed to 48.0 seconds with a memory consumption of 4.3 GB. It is thus clear that the ETL process 200 described with reference to the embodiments of FIGS. 1 to 6 is able to reduce the time needed to execute the ETL process 200 in a way that is not possible by means of prior art approaches for large scale data sets comprising linked data. A further comparison of the performance of similar embodiments of ETL process described with reference to the embodiments of FIGS. 1 to 6 with embodiments making use of a relational database schema and join operations, implemented in sqlite, for a similar dataset as described above of the pubmed publications and authors on another computing system is schematically illustrated in the table in FIG. 9. In the first three columns the time needed, memory usage and disk usage is illustrated for processing 2.8 million pubmed publications, or about one tenth of the total pubmed dataset. The fourth and fifth column show the time needed and memory usage for processing the entire pubmed dataset of about 28 million publications. The fourth and fifth column do not contain any values for the SQLite in-memory case as such an in-memory implementation was no longer possible for a dataset of this size on the computing system. Also the fourth and fifth column do not contain any values for the SQLite (without index) implementation as the time needed for completing the entire dataset was too high to await its full completion. It is clear that both embodiments, this means the python and C++ implementation of ETL process described with reference to the embodiments of FIGS. 1 to 6, which are labeled "Python impl" and "C++ impl" respectively, similar as described above outperform implementations in which there is made use of a relational database schema, which makes of join statements as implemented in SQLite. As shown, the embodiments of the ETL process described with reference to the embodiments of FIGS. 1 to 6, are faster, even when compared to an in-memory SQLite implementation for a limited data set of 2.8 million pubmed publications. As clearly shown, in the disk usage for the limited data set of the 2.8 million pubmed articles, the relational database implementation results in a larger disk usage, which is an indication of a higher number of input output operations, which also become a bottleneck when handling such large scale datasets. It is clear that the performance of a file-based SQLite implementation without making use of suitable indexes is the slowest, but it is further also shown, that adding suitable indexes and even an in-memory implementation in which all database operations are performed in working memory instead of on slower disks, are not able to achieve the performance of the embodiments of ETL process as described above. As is clear form the above description with respect to FIGS. 1 to 6, these embodiments do not make use of a relational database schema, nor any related join operations during the data transformation phase. Instead, there is made use of file based operations, without the use of an intermediate relational database system, or an associated database schema. According to the embodiment described above the test the raw source data 110 was provided as a text file and the output of the ETL process was the author data set with the publications added as data, also in a text file. This output file is created without the need for an intermediate relational database system and its associated database files, nor any processing and storage resources related to the creation and storage of an index. According to a preferred embodiment, there is only made use of a suitable temporary Key Value store, preferably stored in volatile memory and the output generated during the data transformation phase 230 by means of the sequential full table scans at steps 410 and 430 creates the desired output data in a way that reduces the amount of input and output operations needed to output the desired output file comprising the data set 460. When, as in the implementation of the comparative test of FIG. 9, use is made of a schema based relational database implementation, of which the schema comprises a table for the publications, a table for the authors, and a table linking the author identifiers to the publication identifiers and optionally further an index to increase the performance, it is clear that in addition to the output file being generated, the database file for these tables will add to the disk usage during the ETL process. According to the exemplary implementation of the SQLite relational database in FIG. 9 a join operation over the three tables described above from which a script was used to generate an output file that comprises the linked publications for the authors of the authors table by deduplicating the author data by processing the joined data generated by SQLite that comprised data, sorted by the author and in a format of one record for each publication of the authors.

Figures 6, 7:
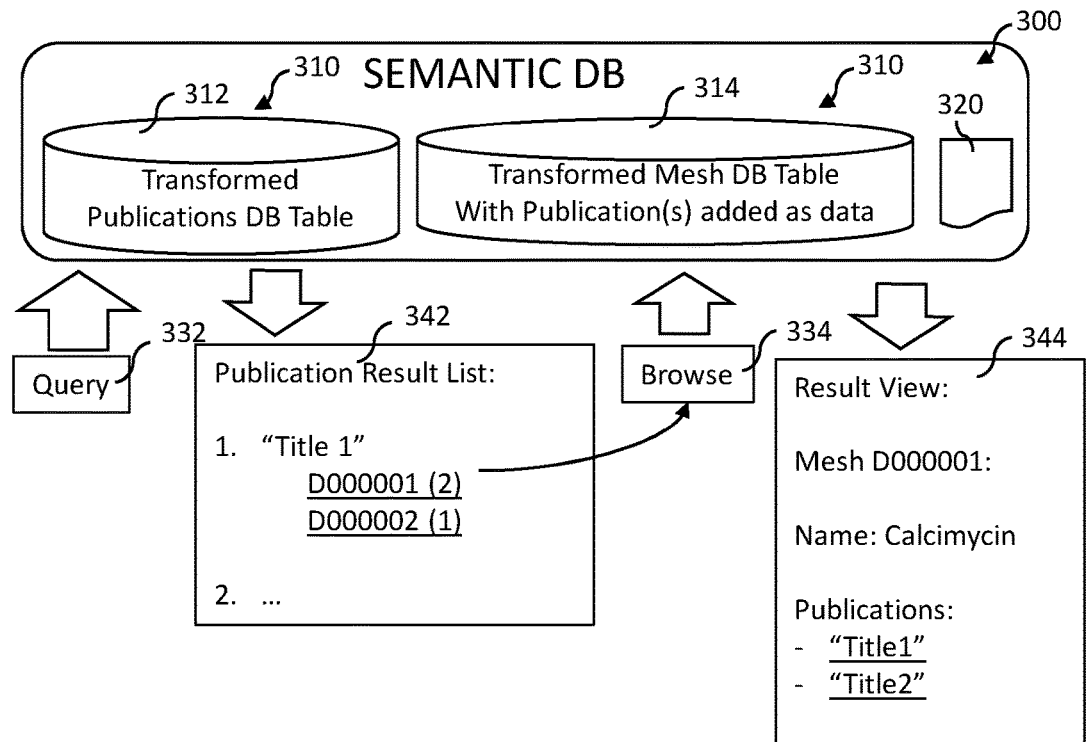

FIG. 7 illustrates an embodiment of a use case which exemplifies the advantages of the embodiment of the above-mentioned ETL process 200 for linked data 300 at the level of the operational database 300. According to the embodiment shown, for example there is inputted a query 332 which returns a Publication result list 342 comprising for example a result relating to the publication with identifier URI/PUB/1 in the transformed publications DB table 312. As shown the data for showing the result list can be retrieved from the operational database 300 as follows. The Title can be retrieved from the can be retrieved from the title column of the transformed publications DB table for the row with of the publication identifier URI/PUB/1. As further shown, next to the title, the result in also shows the linked data with respect to the two MeSH linked to this publication. As shown this data of this result is presented as "D000001 (2)" and "D000002 (1)", and corresponds to the data of the name column and in parentheses the data of the CNT column of the transformed mesh DB table with publications added as data for the respective mesh URI linked to the publication with identifier URI/PUB/1. It is clear that all this data can be retrieved from the linked data 310 as present in the operational database 300 by only retrieving the relevant data related to the respective URIs of the publication or the mesh. No further queries or indexed operations on the linked data 310 is necessary, whereby this data of the result list can be generated very efficiently. Additionally, the displayed MeSH of the result could be provided with a suitable link for issuing a browse request to the operational database in order to show the publications linked to this MeSH. As shown, according to the embodiment of FIG. 7, when for example activating the link for the MeSH with Symbol D000001, the link could for example issue a browse command 334 for a corresponding result view 344 of the corresponding MeSH URI URI/MESH/1. According to the embodiment of the use case shown in FIG. 7, this generates a result view 344 showing based on the data entity 540 related to this mesh URI in the transformed mesh DB table with publications added as data 314. It for example shows the symbol and name entry of the corresponding columns and generates a list of publications based on the publication URIs listed in the PUBLIST column. As shown these publication URIs allow for the retrieval of the corresponding Title entry from the linked data of the transformed publications db Table 312 by means of a simple and efficient look up based on this publication URI. As shown also the publications listed in this result view could for example be provided with suitable links to issue a further browse request based on the publication URI, for example to show further data elements related to the specific publication. It is clear that in this way the linked data 310 as loaded into the operational database 300 by means of the ETL process 200 described above allows for an efficient and performant access of linked data, especially in the context of large scale data sets comprising linked data.

Figures 8, 9:
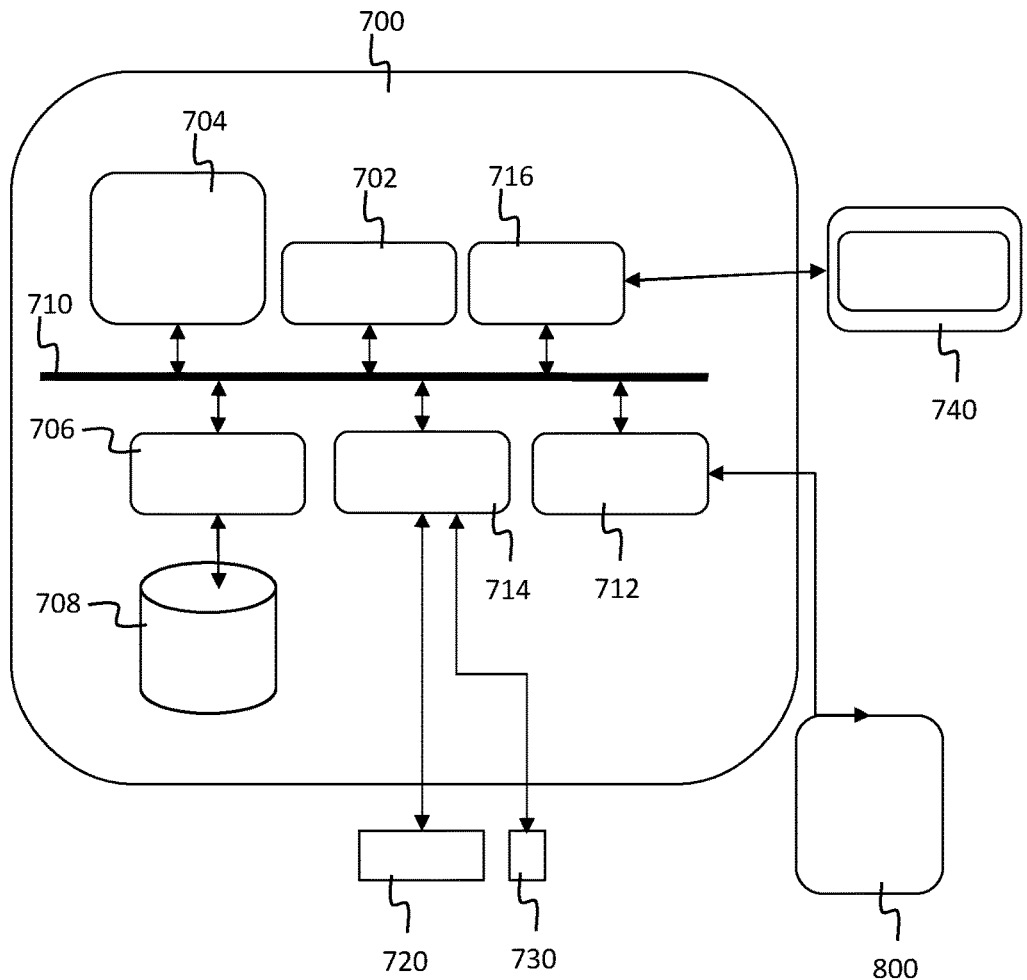
FIG. 8 schematically shows a computing system suitable for performing the computer-implemented method of FIGS. 1 to 5.
FIG. 9 shows a table of a performance comparison of embodiments of the method according to the invention in comparison with embodiments making use of a relational database schema and join operations.

FIG. 8 schematically shows a suitable computing system 700, 800 for executing the computer-implemented method described above. FIG. 8 thus shows a suitable computing system 700, 800 for hosting an automated extract, transform and load system, comprising a processor configured to perform the computer-implemented method 100 or any of its components as described with reference to the above-mentioned embodiments. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706 and one or more storage elements 708. Bus 710 may comprise one or more conductors that permit communication among the components of the computing system. Processor 702 may include any type of conventional processor or microprocessor that interprets and executes programming instructions. Local memory 704 may include a random-access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator to input information to the computing device 700, such as a keyboard 720, a mouse 730, a pen, voice recognition and/or biometric mechanisms, etc. Output interface 716 may comprise one or more conventional mechanisms that output information to the operator, such as a display 740, a printer, a speaker, etc. Communication interface 712 may comprise one or more transceiver-like mechanisms such as for example two 1 Gb Ethernet interfaces that enables computing system 700 to communicate with other devices and/or systems, for example mechanisms for communicating with one or more other computing systems 800. The communication interface 712 of computing system 700 may be connected to such another computing system 800 by means of a local area network (LAN) or a wide area network (WAN), such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example 1 TB SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, flash memory cards, . . . could be used.

The automated extract, transform and load system according to the above-mentioned embodiments could be part of a suitable ETL utility running on a computing system 700 locally available to a developer, such as a personal computer, laptop, etc. or on a remotely accessible computing system such as one or more servers available to a plurality of application developers. Alternatively, the automated extract, transform and load system may also be part of ETL servers, for example comprising web based ETL tools, which execute ETL automation utilities on a scheduled or triggered basis. It is clear that, the automated extract, transform and load system and the associated computer-implemented method, can be implemented as programming instructions stored in the local memory 704 of the computing system 700 for execution by its processor 702. Alternatively, these components could be stored on the storage element 708 or be accessible from another computing system 800 through the communication interface 712. In general, in this way the automated extract, transform and load system and the associated computer-implemented method are provided as a computer program comprising software code adapted to perform this computer-implemented method when executed by a computing system. Alternatively, the automated extract, transform and load system and the associated computer-implemented method could also be provided as a computer readable storage medium comprising computer-executable instructions which, when executed by a computing system, perform the computer-implemented method.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for an automated extract, transform, and load process for a target database comprising linked data, wherein the method comprises the following steps:
   a data extraction phase in which source data is extracted from one or more data sources;
   a data transformation phase in which the extracted source data is transformed to target data for a target database; and
   a data load phase in which the target data is loaded into the target database, wherein the data transformation phase comprises the following steps:
      receiving extracted source data comprising a first data set that comprises first data entities, wherein the first data set is stored in a first table where each row of the first table corresponds to each first data entity of the first data entities, and wherein the each first data entity comprises:
a first data element; and
a first set of second data elements that are related to the first data element;
receiving extracted source data comprising a second data set that comprises second data entities, wherein the second data set is stored in a second table where each row of the second table corresponds to each second data entity of the second data entities, and wherein the each second data entity comprises:
a second data element;
creating a third data set by means of a full table scan of the first data entities of the first data set in which each row of the first table is read in a sequential order until all rows in the first table are read and processed, wherein the third data set comprises third data entities and each third data entity of the third data entities corresponds to a second data element that is related to a first data element in a first data entity of the first data set, wherein the each third data entity comprising:
the second data element; and
a second set comprising an aggregation of all first data elements that the second data element is related to in all the first data entities of the first data set, and wherein the third data set comprises a Key Value Store in which the third data entities are key-value pairs comprising:
the second data element as key; and
the second set as value,
creating a fourth data set comprising the second data set as data elements of the target data which is subsequently loaded into the target database, by means of a full table scan of the second data entities of the second data set in which each row of the second table is read in a sequential order until all rows of the second table are read and processed including:
for each second data entity of the second data set, scanning the third data set to detect a third data entity that comprises a second data element that matches the second data element in the second data entity of the second data set;
upon detecting the third data entity that comprises a second data element that matches the second data element in the second data entity of the second data set, adding the second set corresponding to the second data element in the third data entity to the second data entity of the second data set to create a fourth data entity of the fourth data set;
and wherein:
the third data set is not indexed during the transformation phase or at least up to the creation of the fourth data set;
and wherein, during the data transformation phase:
no database index is stored for the third data set and no further data structure for a database index is created before or during the data transformation phase for the third data set;
no use is made of a relational database system for creating the third data set and the fourth data set; and
no relational database files associated to a relational database system are generated.

2. The method according to claim 1, wherein, during the data transformation phase, no database index is stored for any of the following additional data sets:

the first data set;
the second data set; and
the fourth data set.

3. The method according to claim 1, wherein, the step of creating the fourth data set further comprises:
after creating a fourth data entity of the fourth data set, removing from the third data set the detected third data entity for this created fourth data entity.

4. The method according to claim 3, wherein the data transformation phase, after completion of the step of creating the fourth data set, comprises the further steps of:
storing any remaining third data entities in the third data set as link errors; and
subsequently removing the third data set.

5. The method according to claim 1, wherein the third data set is a temporary data set stored in volatile memory which is removed after creation of the fourth data set.

6. The method according to claim 1, wherein:
the first data element comprises a unique identifier of a first data entity of the first data set; and
the second data element comprises a unique identifier of a second data entity of the second data set.

7. The method according to claim 1, wherein the first data elements and the second data element are stored in a compressed form in each of the third data entities of the third data set.

8. The method according to claim 1, wherein the data transformation phase further transforms the fourth data set to target data for the data load phase.

9. The method according to claim 1, wherein the method comprises the further step of loading the target data into the target database to make the added second set available as a data element of the fourth data entity of the fourth data set.

10. An automated extract, transform and load system, comprising a processor configured to perform the following steps:
a data extraction phase in which source data is extracted from one or more data sources;
a data transformation phase in which the extracted source data is transformed to target data for a target database; and
a data load phase in which the target data is loaded into the target database, wherein the data transformation phase comprises the following steps:
receiving extracted source data comprising a first data set that comprises first data entities, wherein the first data set is stored in a first table where each row of the first table corresponds to each first data entity of the first data entities, and wherein the each first data entity comprises:
a first data element; and
a first set of second data elements that are related to the first data element;
receiving extracted source data comprising a second data set that comprises second data entities, wherein the second data set is stored in a second table where each row of the second table corresponds to each second data entity of the second data entities, and wherein the each second data entity comprises:
a second data element;
creating a third data set by means of a full table scan of the first data entities of the first data set in which each row of the first table is read in a sequential order until all rows in the first table are read and processed, wherein the third data set comprises third data entities and each third data entity of the third data entities corresponds to a second data element that is related to a first data element in a first data entity of the first data set, wherein the each third data entity comprising:
 the second data element; and
 a second set comprising an aggregation of all first data elements that the second data element is related to in all the first data entities of the first data set, and wherein the third data set comprises a Key Value Store in which the third data entities are key-value pairs comprising:
  the second data element as key; and
  the second set as value,
creating a fourth data set comprising the second data set as data elements of the target data which is subsequently loaded into the target database, by means of a full table scan of the second data entities of the second data set in which each row of the second table is read in a sequential order until all rows of the second table are read and processed including:
 for each second data entity of the second data set, scanning the third data set to detect a third data entity that comprises a second data element that matches the second data element in the second data entity of the second data set;
 upon detecting the third data entity that comprises a second data element that matches the second data element in the second data entity of the second data set, adding the second set corresponding to the second data element in the third data entity to the second data entity of the second data set to create a fourth data entity of the fourth data set;
and wherein:
 the third data set is not indexed during the transformation phase or at least up to the creation of the fourth data set;
and wherein, during the data transformation phase:
 no database index is stored for the third data set and no further data structure for a database index is created before or during the data transformation phase for the third data set;
 no use is made of a relational database system for creating the third data set and the fourth data set; and
 no relational database files associated to a relational database system are generated.

11. A non-transitory computer-readable storage medium carrying a computer program comprising instructions which, when the computer program is executed by a computer, cause the computer to carry out a method, wherein the method comprising the following steps:
 a data extraction phase in which source data is extracted from one or more data sources;
 a data transformation phase in which the extracted source data is transformed to target data for a target database; and
 a data load phase in which the target data is loaded into the target database, wherein the data transformation phase comprises the following steps:
  receiving extracted source data comprising a first data set that comprises first data entities, wherein the first data set is stored in a first table where each row of the first table corresponds to each first data entity of the first data entities, and wherein the each first data entity comprises:
   a first data element; and
   a first set of second data elements that are related to the first data element;
  receiving extracted source data comprising a second data set that comprises second data entities, wherein the second data set is stored in a second table where each row of the second table corresponds to each second data entity of the second data entities, and wherein the each second data entity comprises:
   a second data element;
  creating a third data set by means of a full table scan of the first data entities of the first data set in which each row of the first table is read in a sequential order until all rows in the first table are read and processed, wherein the third data set comprises third data entities and each third data entity of the third data entities corresponds to a second data element that is related to a first data element in a first data entity of the first data set, wherein the each third data entity comprising:
   the second data element; and
   a second set comprising an aggregation of all first data elements that the second data element is related to in all the first data entities of the first data set, and wherein the third data set comprises a Key Value Store in which the third data entities are key-value pairs comprising:
    the second data element as key; and
    the second set as value,
  creating a fourth data set comprising the second data set as data elements of the target data which is subsequently loaded into the target database, by means of a full table scan of the second data entities of the second data set in which each row of the second table is read in a sequential order until all rows of the second table are read and processed including:
   for each second data entity of the second data set, scanning the third data set to detect a third data entity that comprises a second data element that matches the second data element in the second data entity of the second data set;
   upon detecting the third data entity that comprises a second data element that matches the second data element in the second data entity of the second data set, adding the second set corresponding to the second data element in the third data entity to the second data entity of the second data set to create a fourth data entity of the fourth data set;
and wherein:
 the third data set is not indexed during the transformation phase or at least up to the creation of the fourth data set;
and wherein, during the data transformation phase:
 no database index is stored for the third data set and no further data structure for a database index is created before or during the data transformation phase for the third data set;
 no use is made of a relational database system for creating the third data set and the fourth data set; and
 no relational database files associated to a relational database system are generated.

* * * * *

UNITED STATES PATENT AND TRADEMARK OFFICE
CERTIFICATE OF CORRECTION

| | | |
|---|---|---|
| PATENT NO. | : 12,174,848 B2 | Page 1 of 1 |
| APPLICATION NO. | : 17/266432 | |
| DATED | : December 24, 2024 | |
| INVENTOR(S) | : Kenny Knecht et al. | |

It is certified that error appears in the above-identified patent and that said Letters Patent is hereby corrected as shown below:

On the Title Page

Item (73), Change:
"(73) Assignee: ONTOFORCR NV, Ghent (BE)"
To:
--(73) Assignee: ONTOFORCE NV, Gent (BE)--

Signed and Sealed this
Eleventh Day of February, 2025

Coke Morgan Stewart
*Acting Director of the United States Patent and Trademark Office*